United States Patent

[11] 3,573,876

| [72] | Inventor | John William Powell<br>Little Arce Ballards Close, Lytchett<br>Matravers, Poole, Dorset, England |
|---|---|---|
| [21] | Appl. No. | 787,512 |
| [22] | Filed | Dec. 27, 1968 |
| [45] | Patented | Apr. 6, 1971 |
| [32] | Priority | Jan. 11, 1968 |
| [33] | | Great Britain |
| [31] | | 1712/68 |

[54] ARRANGEMENT FOR RELEASABLY COUPLING A MEMBER TO A ROTATABLE BODY
6 Claims, 4 Drawing Figs.

[52] U.S. Cl............................................. 279/1,
24/126, 287/119, 90/11.1, 279/2, 287/53
[51] Int. Cl............................................. B23b 31/14
[50] Field of Search........................................ 279/2, 9
(Cursory), 1 (C), 66, 68, 86, 96, 102; 287/5, 3
(TK), 119 (Cursory); 24/115.7, 211 (K), 230.1
(N), 263.5, 263 (RC), 263 (SB); 269/272;
90/11.1; 77/60; 82/(Inquiry)

[56] References Cited
UNITED STATES PATENTS

| 599,255 | 1898 | Robinson ..................... | 269/272X |
| 2,830,822 | 4/1958 | Thompson..................... | 279/66 |
| 3,115,798 | 12/1963 | Donaway....................... | 279/2X |

FOREIGN PATENTS

| 472,995 | 1914 | France ........................ | 24/211(K) |

Primary Examiner—Andrew R. Juhasz
Assistant Examiner—Donald D. Evenson
Attorney—Barthel and Bugbee ABSTRACT: An arrangement for releasably coupling a member to a rotatable body includes two substantially identical locking pieces positioned within a transverse or diametrical bore of the rotatable body and connected together by O-rings such that they can move transversely of the body in opposite directions; with respect to each other. On rotation of the body, the locking pieces move apart under centrifugal force, their ends extending beyond the surface of the body to engage a member mounted on the body. Alternatively, the body is provided with an axial bore and the locking pieces have holes alignable with the bore to accommodate the shank of a tool. Rotation of the body causes the locking pieces to move apart, the edges of their holes gripping the shank of the tool.

PATENTED APR 6 1971 3,573,876

INVENTOR
JOHN WILLIAM POWELL

Cullen Sloman & Cantor
ATTORNEY

ARRANGEMENT FOR RELEASABLY COUPLING A MEMBER TO A ROTATABLE BODY

BACKGROUND OF THE INVENTION

This invention relates to an arrangement for releasably coupling a member to a rotatably body, for example, a spindle or shaft.

Conventional apparatus for causing a member to be releasably coupled to a rotatable body are at present wide and varied. Such conventional apparatus may, for example, take the form of collets that are actuated via screw means, such apparatus calling for high precision assembly of said screw means and collets, and in addition, the use of a spanner, chuck key, or other means, to cause the screw means to be actuated each time a member has to be locked in or on the rotatable body as well as each time a member has to be released therefrom.

Another known form of the apparatus employs springs, either in tension or compression, to bias the collets to the setting in which the collets grip the body. Such apparatus requires considerable skill in the manufacture and assembly thereof and, moreover, can tend to lose its grip when the body is rotating at high speed; and can deteriorate rapidly in effectiveness due to normal wear.

It is an object of the present invention to provide an arrangement for releasably coupling a member to a rotatable body, and in which said means (a) does not require a tool or tools to cause it to lock with the body; (b) does not deteriorate with wear; (c) provides a firm grip on the member, especially at high speeds; (d) does not employ screw means; and (e) does not employ metal tension or compression springs.

It is a further object of the invention to provide said arrangement such that it can be used to (a) hold a member having an axially extending bore in said body; (b) hold a member having an axial bore and through which the rotatable body can extend.

SUMMARY OF THE INVENTION

According to the present invention, an arrangement for releasably coupling a member to a rotatable body, such as a shaft, comprises a rotatable body having at least one transverse bore extending diametrically therethrough, a pair of substantially identical locking pieces arranged within the bore and means for connecting the locking pieces together, the arrangement being such that the connecting means allows limited relative longitudinal movement between the locking pieces whereby one end of each locking piece can move outward in opposite directions beyond the bore during rotation of the shaft in response to the action of centrifugal force to grip a bored member slidably mounted on the shaft. Preferably, the connecting means are a pair of O-rings.

The invention further consists in, an arrangement for releasably coupling a member to a rotatable body, comprising a rotatable body having at least one transverse bore extending diametrically therethrough and an axial bore which extends from one end face of the body to the diametrical bore, a pair of substantially identical locking pieces arranged within the diametrical bore each locking piece having a hole alignable with the axial bore whereby the shank of a drill, top reamer or the like can be passed through the axial bore in the body and the holes in locking pieces and means for connecting the locking pieces together, the arrangement being such that the connecting means allow limited relative longitudinal movement between the locking pieces whereby on rotation of the body, the locking pieces move apart within the diametrical bore, the sides of their holes gripping the shank of a drill, top reamer or the like extending through the axial bore and the holes in the locking pieces.

To permit the locking pieces to grip the shank of a tool such as a drill, the rotatably body, which may be a shaft, may be formed with an axially extending bore that passes through said one or more diametrically extending bores, the shank of each tool being a sliding fit in said axially extending bore. Each locking piece has a tail portion that has a hole or bore of sufficient size to accommodate the shank of the tool and positioned such that it is normally held in alignment, or approximately in alignment, with said bore in the rotatable body so that the shank of the tool can be caused to pass through the bores in the tail portions of the locking pieces. If the bores in the locking pieces, at zero rotational speed of the rotatable body, are not in exact alignment with the axially extending bore of the rotatable body, the necessary alignment can be brought about by providing a slight lead or chamfer on the inner end of the member to be gripped, this lead or chamfer, as the tool is inserted, acting on the bores in said tail portions to cause the bores therein to assume the desired alignment with the axially extending bore in the rotatably body. Alternatively, or in addition, the effect of the O-rings, at zero rotational speed of the rotatable body, is such that an outer head of each locking locking piece is flush with, or projects slightly from, the surface of the rotatable body in which it is displaceable. By exerting finger pressure on the heads of two opposed locking pieces these can be moved inwardly to a setting in which the bores in their tail portions are in alignment with the axially extending bore in the rotatable body.

At high rotational speeds of the rotatable body the centrifugal effect on the locking pieces is such that they move apart in a manner rigidly gripping the shank of the tool extending through the bores in their tail portions.

It will be appreciated that the coupling arrangement of the present invention does not require any additional appliance to assist the insertion and locking, or the releasing or withdrawal, of the tool. This feature is of considerable importance where speed of tool change is required, for example, in the drilling of electronic printed circuit boards on multispindle machines where drill changing by means of the present invention can save up to 15 percent of the total drilling time.

BRIEF DESCRIPTION OF THE DRAWINGS

In order that the invention may be more clearly understood, an embodiment thereof will now be described by way of example, reference being made to the accompanying drawing in which.

DESCRIPTION OF PREFERRED EMBODIMENT

Figure 1:
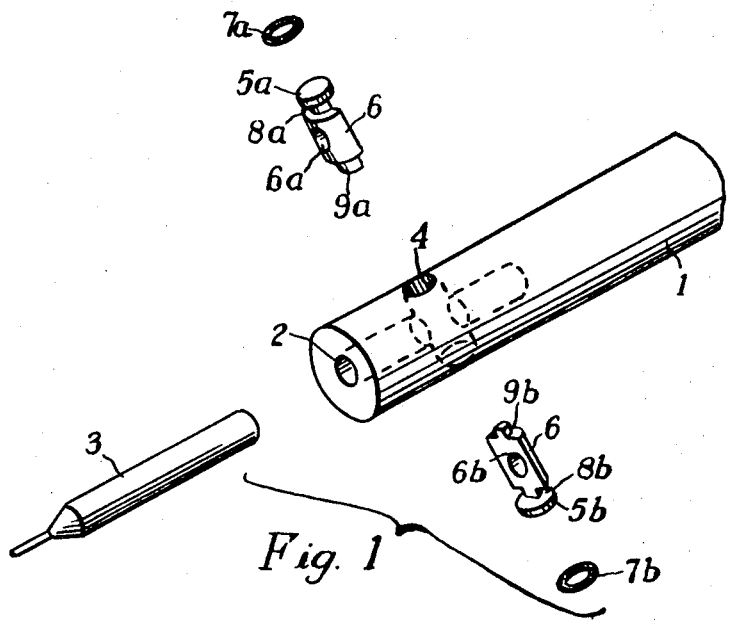
FIG. 1 is an exploded perspective view of an arrangement of the invention.

Referring first to FIG. 1 it will be seen that there is provided a shaft 1 having an axially extending bore 2 at one end thereof. The shank 3, of a drill, is of such diameter that it is a close fit in the axially extending bore 2. The shaft 1 is formed with a diametrically extending bore 4 that cuts across the axially extending bore 2.

Two identical locking pieces 5a, 5b, are shown having cylindrical heads that are a sliding fit in the diametrical bore 4.

Each locking piece has a tail portion 6 in the form of a semicylinder. The tail portion 6 of the locking piece 5a, has a hole or bore 6a; and the tail portion 6 of the locking piece 5b has a hole or bore 6b. The bores 6a, 6b, extend in a direction normal to the longitudinal axes of the locking pieces 5a, 5b.

When the semicylinder tail portions 6 are inserted into the bore 4 they combine to form a cylindrical body that is a sliding fit in the bore 4. It will be noted from FIG. 1 that there is a groove 8a between the locking piece 5a and its associated tail portion 6; as well as a groove 8b between the locking piece 5b and its associated tail portion 6. Each tail portion is also of reduced size at its inner end as indicated at 9a, and 9b. The arrangement is such that when the two locking pieces are inserted into the bore 4 the groove 8a cooperates with the portion of reduced size 9b to form an annular groove in which an O-ring 7a can be housed. In a similar manner the groove 8b cooperates with the portion 9a of reduced size to form an annular groove in which an O-ring 7b be housed.

Figure 2:
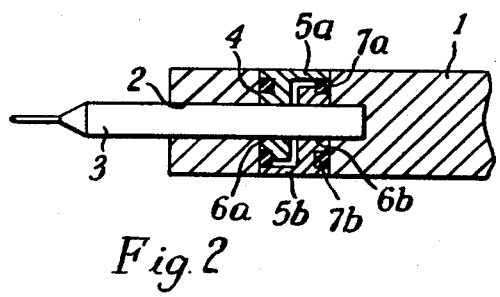
FIG. 2 is a diagrammatic axial cross section of the arrangement of FIG. 1, showing a drill coupled to a rotatable shaft.

FIG. 2 shows the locking pieces 5a, 5b assembled in the bore 4 with the O-rings 7a and 7b in position in their grooves 8a, 8b respectively. It will be noted that the O-rings 7a, 7b tend to yieldingly urge lengthwise relatively to one another in opposite directions the two tail portions 6 into slightly spaced-apart relationship as measured in the direction in which the locking pieces are slidable. This slightly spaced-apart relationship causes the outer surfaces of the cylindrical heads of the locking pieces 5a, 5b normally to project slightly above the outer surface of the shaft 1. With such an arrangement finger pressure can be exerted on the outer surfaces of the locking pieces to move them inwardly to cause the bores 6a, 6b therein to move to a setting in which the shank 3 of the drill can extend therethrough. On releasing said finger pressure the O-rings cause the locking pieces to move apart again and thus grip the said shank 3. When the shaft 1 is rotated at high speed the locking pieces tend to move apart under centrifugal force and thus exert a strong locking action on said shank 3.

Figures 3, 4:
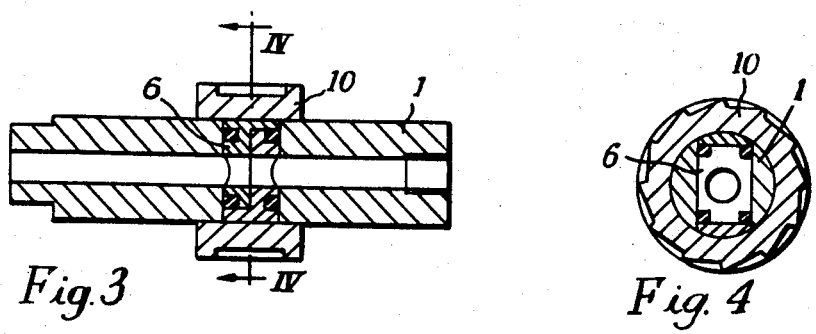
FIG. 3 is a diagrammatic axial cross section of the arrangement showing a turbine wheel mounted on a rotatable shaft.
FIG. 4 is a section on the line IV-IV of FIG. 3.

FIG. 3 shows an embodiment that is identical with that described with reference to FIGS. 1 and 2, except that the shank 3 is absent and the collet is positioned under a turbine wheel 10. Such an arrangement is convenient in many small air turbines, a particular example of which is the high-speed dentists drill. Here very little space is available in which to engineer the collet since the outside cylindrical surfaces of the shaft 1 are bearing surfaces and may not be interfered with. The arrangement shown in FIGS. 3 and 4 is a compact solution.

It is known for the turbine wheel 10 to be an interference fit on shaft 1. This of course makes it difficult to replace worn or damaged turbine wheels.

It will be appreciated that in the particular embodiment described with reference to FIGS. 3 and 4 the arrangement of the locking pieces 5a, 5b is such that they do not project beyond the outer surface of the shaft 1 even at high rotational speeds, if a drill is to be inserted into bore 2, since if this were to occur the grip could be lost on the drill located in the axial bore 2 and thus defeat the purpose of the locking pieces.

However, when a member having an axial bore is to be fitted on to a shaft or spindle provided with the aforesaid locking pieces, the axial bore in said member is made a sliding fit on said shaft or spindle and the member is then slid on to the spindle to a position in which it surrounds said bore containing the locking pieces. The arrangement will then be such that the O-rings cause the locking pieces to be biased outwardly in a manner causing them to contact said member and prevent it from accidentally sliding off the shaft or spindle. At high rotational speeds of the spindle or shaft the centrifugal effect on the locking pieces is such that they tend to move outwardly in a manner rigidly locking against the member on the shaft or spindle.

With such an embodiment the cylindrical heads of the locking pieces may be slightly domed if desired, so that said member can be slid into position without any prior compression of the locking pieces, said domed formations acting as cam surfaces.

Having now described some embodiments of the present invention it will be appreciated that many modifications may be made thereto.

Thus, for example, there may be more than one transverse bore 4 containing said locking pieces; for example, a bore 4 that extends diametrically across the shaft 1 in a direction at right angles to the bore 4 as illustrated and spaced therefrom along the shaft 1.

The device of the present invention provides a collet the accuracy of which depends upon the accurate location of the bore 2 in terms of its concentricity and parallelium to the axis of the shaft bearings and by the clearance between the drill shank diameter and the diameter of the bore 2. For a close fitting drill the accuracy of the drill location is not influenced by any geometric error that might be present in the bores 6a, 6b in the tail portions 6, and for the same reason wear in these bores does not affect the accuracy with which the shank of the drill is held.

The shaft described above in association with the locking pieces therein, is suitable for use with speeds up to 500,000 r.p.m.

It will be appreciated that the collets of the present invention may be used in association with high-speed air turbines or electric high frequency motor driven drilling spindles, for example, for use with printed circuit board or other precision drilling applications such as high-speed air turbine driven dental drills.

I claim:

1. An arrangement adapted to centrifugally and releasably couple to a rotatable body a member slidably mounted thereon, said arrangement comprising:
    a rotatable body having at least one transverse bore extending diametrically therethrough;
    a pair of substantially identical locking pieces arranged within the transverse bore for free sliding motion in opposite directions relatively to one another; and
    means for yieldingly connecting the locking pieces together in outwardly urged relationship whereby on rotation of the body the connecting means allow limited relative longitudinal movement between the locking pieces as the outer ends of the locking pieces move outward beyond the transverse bore in response to centrifugal force acting thereon resulting from rotation of the body to engage the member mounted on the body.

2. An arrangement as claimed in claim 1, wherein the connecting means are a pair of O-rings.

3. An arrangement as claimed in claim 1, wherein each locking piece includes a head portion for engaging the member mounted on the body, a groove for accommodating the connecting means, a semicylindrical tail portion, and a part of reduced diameter on the tail portion alignable with the groove on the other locking piece of the pair, said connecting means encircling each groove and the reduced diameter part aligned therewith.

4. An arrangement adapted to centrifugally and releasably couple to a rotatable body a member slidably mounted therein, said arrangement comprising:
    a rotatable body having at least one transverse bore extending diametrically therethrough and also having an axial bore extending from one end face of the body to the transverse bore;
    a pair of substantially identical locking pieces arranged within the transverse bore for free sliding motion in opposite directions relatively to one another;
    each locking piece having a hole alignable with the axial bore,
    means for yieldingly connecting the locking pieces together in outwardly urged relationship whereby on rotation of the body the connecting means allow limited relative longitudinal movement between the locking pieces as the locking pieces move outward within the transverse bore in response to centrifugal force acting thereon, and the sides of their holes consequently grip the member mounted in the axial bore and in the holes in the locking pieces.

5. An arrangement as claimed in claim 5, wherein the connecting means are a pair of O-rings.

6. An arrangement as claimed in claim 5, wherein each locking piece includes a groove for accommodating the connecting means, a semicylindrical tail portion, and a part of reduced diameter on the tail portion alignable with the groove on the other locking piece of the pair, said connecting means encircling each groove and the reduced diameter part aligned therewith.